Dec. 26, 1939.   O. A. ROSS   2,184,816
OPTICAL APPARATUS
Filed Oct. 31, 1936
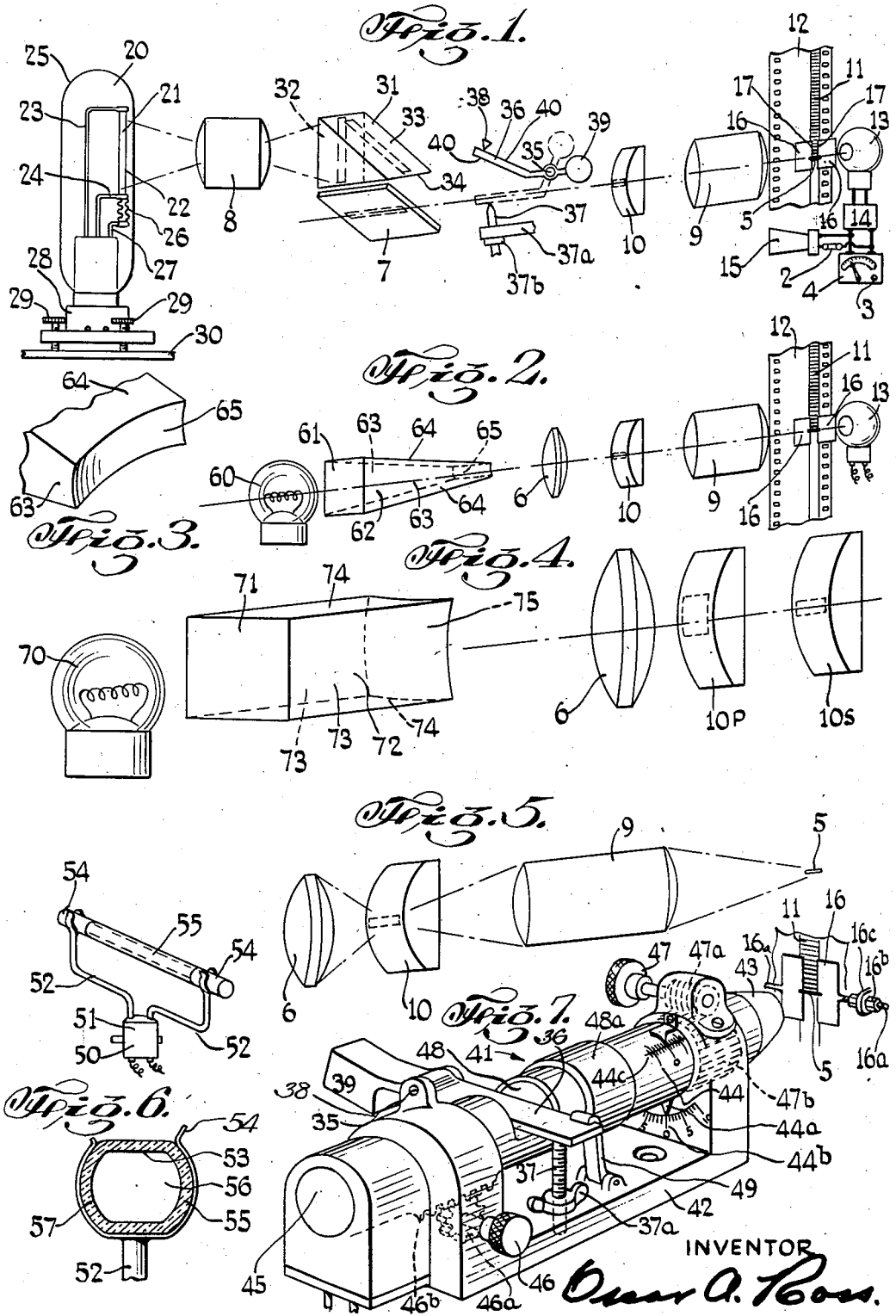
INVENTOR
Oscar A. Ross.

Patented Dec. 26, 1939

2,184,816

UNITED STATES PATENT OFFICE 2,184,816

OPTICAL APPARATUS

Oscar A. Ross, New York, N. Y.

Application October 31, 1936, Serial No. 108,566

12 Claims. (Cl. 179—100.3)

This application is a continuation in part of my pending application, Serial No. 470,807, filed, July 26, 1930.

This invention relates to optical systems, light sources therefor and manner of checking optically projected light images more particularly used for recording and reproducing sound.

This invention in part comprehends furnishing novel and peculiar light sources of elongated form wherein the margins thereof are in comparatively precise parallelism whereby they may be imaged as minute precise linear light images of highly attenuated form transversely of a sound track on film for recording or reproducing sound, said linear light images being comparatively free of light fringe and having the margins thereof in comparatively exact parallelism whereby more faithful recording or reproduction of sound is obtained.

The invention further comprehends projecting said optically formed precise linear image transversely of a sound track beyond the margins thereof and adjustably masking off the end portions thereof whereby focussing and adjustment of said linear light image with respect to angularity thereof with said sound track may be accomplished solely by rotary and axial movement of the optical elements of the optical system forming said image, said rotary movement effecting angular adjustment and axial movement the focussing thereof.

The invention further comprehends furnishing a light source for optical systems including an elongated filament aligned to one plane irrespective of the elongation thereof by heating from cold state to incandescence.

The invention further comprehends furnishing an optical system wherein an optically formed linear light image intersecting the axis of the system is optically rotated on said axis with respect to the light source whereby said optically formed light image may be projected in a plane angularly disposed to the plane of said light source.

This invention further comprehends furnishing a novel and peculiar manner of checking the position of projected light images, particularly light images optically projected onto film for recording or reproducing sound. In present checking systems, it is customary to reproject the light image onto a screen or optical member on which parallel lines or an outline of said image has been added for comparison visually with said image during adjustment or checking, this method requiring or depending upon accuracy of vision for correct adjustment. The present invention comprehends inserting an opaque mask having an area or width corresponding to the area or width of the projected light image into the path of the optical system whereby all the projected light will be cancelled at the film if the system is properly focussed and of proper angularity with respect to said film, but will permit leakage light to pass to said film if not so properly focussed or in proper angularity to said film. Said leakage light may be readily visually observed but is preferably measured by instruments energized by said leakage light directed onto a light sensitive cell rearwardly of the film and in the case of reproducing sound, the usual light sensitive cell may be employed for energizing said instrument through associated amplifier, employed for energizing the loudspeaker.

This invention further comprehends furnishing optical systems wherein a secondary light source having precise margins and a precise uniform light intensity over the field thereof is formed from a primary light source wherein the light emitted therefrom does not have precise uniformity with respect to intensity and margins thereof, said secondary light source being also formed to materially reduce the light fringe of a light image optically projected therefrom, particularly with respect to the light fringe produced by the curvature of the optical elements employed for projecting said light image, this result being accomplished by forming said secondary light source with a concave face when correlated to a spherical objective and with a cavo-cylindrical face when correlated to a cylindrical objective for optically projecting said secondary light source.

This invention further comprehends providing means for adjustably and independently masking off the end portions of a linear light image optically projected onto a sound track whereby first run films may have a maximum length light image projected onto said sound track for producing maximum faithfulness of sound reproduction and as said films become worn through continued projection, causing in part excessive weaving, the end portions of said light image may be adjustably masked off for shortening thereof thereby preventing objectionable ground noises, as for example, is produced if said weaving exposes the sprocket holes in said film to the sound head light slit thereby producing a 96 cycle hum, or if the picture area is likewise exposed also producing a 24 cycle hum together with other disturbing ground noises.

Other objects and advantages will appear as the description of the invention progresses and the novel and peculiar features thereof are pointed out in the drawing wherein:

Figure 1 is a part diagrammatic, part elevational view of one form of improved optical system and elements therein, and Fig. 2, part diagrammatic, part perspective view of a modified form of optical system, and Fig. 3 is an enlarged perspective view of one of the elements in said last-named system, and Fig. 4 is an enlarged part diagrammatic, part perspective view of another modified form of optical system shown in Fig. 2, and Fig. 5 is a part diagrammatic, part perspective view of still another modified form of optical system, and Fig. 6 is an enlarged sectional view of the light source shown in Fig. 5 and Fig. 7 is a perspective view of the mounting for said optical systems.

Referring to Fig. 1, showing one form of optical system for recording or reproducing sound, objective 8 optically projects the edge face 22 of ribbon filament 21 as a rectangular light image onto face 32 of prism 31, the correlated faces 33 and 34 of which act to project said image onto optical member or reflector 7, cylindrical objective 10 acting to attenuate said image and objectives in lens system 9 further acting to optically project said attenuated light image as a more highly attenuated minute linear light image 5 transversely of sound track 11 on film 12, said sound track being assumed to have sound recorded thereonto for reproduction as said film is advanced relatively to said light image 5 and light sensitive cell 13. Linear light image 5 normally extends beyond the margins of sound track 11, however, the end portions thereof are masked off by adjustably positioned opaque masking members 16, the inner margins 17 of which extend inwardly of the margins of said sound track when said system is employed for reproducing sound whereby solely the center portion thereof is exposed to the light of linear light image 5 for reproducing said sound, in this manner eliminating distortion produced by the ragged sound track margins generally produced during development of the film emulsion wherein the sound record is optically formed. When sound is to be recorded on film, said masking members 16 are moved outwardly until the margins 17 thereof register with the margins of said sound track as shown in Fig. 7.

As shown in Figs. 1 and 2 film 12 which may be a sound motion picture film including both picture and sound records, is assumed to be advanced for reproducing sound and pictures, the light from linear image 5 being modulated by the sound record as projected onto light sensitive cell 13 connected to the input of amplifier 14, the output of which energizes loudspeaker 15 for reproducing said sound audibly. Also connected to the output of said amplifier is ammeter, or leakage light checking instrument 4 having push button 3 for placing said instrument in circuit with said amplifier as more fully hereinafter described.

Referring to Fig. 2, showing a modified form of optical system for recording or reproducing sound, primary light source 60 projects light onto receiving face 61 of quartz prism 62, the similar faces 63 and 64 of which are preferably inwardly mirrored for augmenting the uniformity of light intensity projected by secondary light source or rectangular face 65, said face being concave (Fig. 3), the curvature thereof being proportioned to the curvature of the rear face of objective 6. The upper and lower faces 64 are also slightly cylindrical, the curvature thereof being proportional to the depth or curvature of the concave face 65 whereby the light image as projected by objective 6 onto cylindrical objective 10 is formed with precisely parallel upper and lower margins, said last-named objective acting to attenuate said light image and optical system or objectives 9 acting to form a more attenuated light image 5 at the sound track 11 for the same purpose as described for Fig. 1. By thusly forming said secondary light source on face 65 substantially all light fringe due to difference in foci were the face 65 flat.

Referring to Fig. 4 showing a modified system of the optical system shown in Fig. 2, light source 70, similar to source 60, projects light onto receiving face 71 of rectangular quartz prism 72, the parallel faces 73—73 and 74—74 of which are preferably inwardly mirrored for the same purpose as described for prism 62 whereby a more uniform light intensity is obtained on concave face or secondary light source 75, the curvature of which is proportional to the curvature of the objective 6 and spacing therebetween and for the same purpose as described for secondary light source 65, cylindrical lens or objective 10P acting to attenuate said secondary light source as projected onto similar objective 10S for further attenuation, the lens system 9 (not shown) acting to form or project a highly attenuated linear light image transversely of sound track 11 in the same manner as described for Fig. 2, and for the same purpose.

Referring to Fig. 5, showing a modification of the optical system shown in Fig. 1, light source 50 replaces the light source 20, lens system 8, prism 31 and mirror member 7, the system being otherwise the same including the light image checking member 36 and associated parts. Light source 50 comprises base 51 having clamping conductors or members 52 clampably supporting tubular light source or lamp 55 including transparent tube or gas container 57 (Fig. 6), sealed by lamp terminals 54 engaging members 52, said lamp being preferably filled with mercury vapor, neon, or similar gases of high actinic properties which become luminous when electrically energized, and said tubular member 57 being preferably made with parallel wall portions 53—53 (Fig. 6) whereby the margins of said light source will have substantially the same light intensity as the mid portion thereof and will be precise with respect to the parallelism thereof. The objectives 6, 10 and lens system 9, act to project elongated light source 55 as a minute precise linear light image 5 at the sound track 11 as described for Fig. 1, and for the same purpose as hereinbefore described.

Referring to Fig. 1, the checking of the angularity of linear light source 5 with respect to the advancement of sound track 11 is accomplished as follows. Opaque masking or checking member 36, pivoted at 35, is normally maintained against stop 38 by counterweight 39, being therefore out of the path of projected light. When it is desired to check said angularity, said masking or checking member is moved into the light path against adjustable stop 37 adjustable in fixed member 37a and locked by locking nut or member 37b. The spacing of the margins 40 of member 36 correspond to the spacing of the margins of the projected light image at the point in the light beam wherein said checking member 36 is inserted with the optical system properly focussed. Said checking member is preferably made longer than the length of the light image, especially when employed in connection with the system disclosed wherein the masking members 16 control the length of image 5. Assuming that image checking member 36 has been inserted into the path of light against stop 37, if the system is properly focussed and the angularity of said image with respect to the advancement of sound track 11, all light will be concelled at said sound track. If however, said system is not properly focussed or if the angularity of image 5, is not correct with respect to the advancement of said track, light will leak past said checking member 36 and appear at said track, also passing to light sensitive cell 13 as a result of which it may be measured by instrument 4. Said leakage light may also be visually observed at the sound track 11 rearwardly thereof, and if desired said observation may be made with a telescope including a prism inserted into the light path between said film and light sensitive cell 13. Said leakage light may also be observed by closing switch 2 thereby energizing loud speaker 15, in this manner audibly indicating said leakage light. When audibly determining the leakage light, it is preferable to advance a film having a constant frequency note and the volume thereof may be measured by a sound volume or amplitude measuring instrument indicating the intensity thereof in decibels. When instrument 4 is employed it is preferable to have switch 2 opened. It is to be understood that said image checking device may be employed in any of the optical systems shown as well as in other known systems wherein light slits or aperture plates are employed for preforming the linear light image projected at the sound track, as 11, or said leakage light checking device may be employed in connection with known systems not employing said light slit or aperture plates.

Referring to Fig. 1, light source 20, comprises transparent container 25, supporting filament supporting conductors 23 and 27 between which filament 21 is suspended, the lower end thereof having tension producing portion 26 acting to hold said filament in tension whereby elongation thereof by heating will be compensated for, thereby holding said filament in alignment between support 23 and guide member 24 through which said filament slides and is guided thereby for alignment. Light source 20 is secured to base 28, adjustably positioned by screws 29 on fixed member 30. By thusly maintaining filament in alignment, precise parallelism of the flat faces thereof is obtained whereby the light image, as 5, projected thereof becomes a precise linear image without the masking thereof edgewisely. Furthermore, by forming said filament as a ribbon and exposing the edge thereof as a light source for optical projection, comparatively precise parallel margins are obtained in the projected light images, as compared to a round filament which produces ragged margins when viewed as a linear light source during incandescence, the depth of said ribbon filament compensating for any irregularities in the surface thereof during incandescense.

Referring to Fig. 7, showing a prefered mounting 41 for said optical systems for use in reproducing sound, base unit 42 rotatively and slidably supports objective and light source unit 43 comprising light source housing 45 and lens barrel or tube member 44 secured to said housing. Unit 43 is slidably adjusted on base unit 42 by adjusting screw 46 carrying pinion 46a meshing with rack 46b on barrel 44, and is rotatively adjusted with respect to said base unit by worm screw 47 carrying worm 47a engaging worm 47b on said barrel 44, said barrel having opening 48 normally covered by tubular cover 48a arranged to be slid therefrom for entrance of image checking member 36 pivotally supported on said base unit 42 by pin 35, said base unit also supporting stop screw 37 adjustably positioned and locked by nut 37a. Base unit 42 is preferably fixed in the sound head of the sound motion picture projector advancing film 12. Hook member 49, pivotally secured to base unit 42 is arranged to constrain light image checking member in the checking position when hooked over the end thereof, as shown.

Masking members 16 are secured to threaded members 16a passing through fixed member 16b and are adjustably locked in position by locking members or nuts 16c whereby said masking members may be adjustably positioned with respect to sound track 11, the margins 17 of said members being preferably adjusted to register with the margins of said track for recording sound and adjusted inwardly of said track when reproducing said sound.

When said optical systems are to be employed for recording sound the image checking device including member 36 thereof is placed beyond the light valve with respect to the light source whereby said checking member will check the aperture in said light valve when in unmodulated state.

Furthermore if it is desired to insert an aperture plate or light slit into the path of any one of said optical systems, said image checking member 36 is also placed beyond the aperture in said plate whereby the angularity of said aperture may be checked as described.

In the forms of optical systems shown in Figs. 2, 4 and 5, the light image checking apparatus is preferably placed between cylindrical objectives 10 and 10P, and lens unit 9, the width of shutter 36 corresponding to the width of the light path projected at that position, thereby checking all light fringe rearwardly of said lens unit or image reducing objective combination 9. Said light image checking apparatus may be made of reduced size and positioned between said unit 9 and film 12 in this manner, checking all the light fringe in the optical system as well as the proper focus and angularity thereof.

Whereas light image checking shutter 36 has been shown as supported for pivotal movement, said shutter may be slidably mounted on a fixed member having a guide opening through which said shutter may be slid through opposite openings in barrel 44 into a guide opening in another fixed guide member on the opposite side of barrel 44, the side opening in said barrel being of sufficient size to permit rotative and axial movement of said barrel after said slidable shutter has been inserted through said barrel for checking said light image.

For the purpose of showing the angular position of light image 5 with respect to the sound track, barrel 44 is provided with an indicator or pointer member 44a operating over a dial or scale 44b on base unit 42, the rotation of said barrel to the adjusted position being shown by said scale and indicator. The focussed position or axial movement of said barrel is also indicated by the indicator or pointer 42a operating over scale 44c on barrel 44, said indicator 42a being fixed on base unit 42. Whereas the teeth 47b meshing with worm 47a are made straight to permit axial movement therebetween for more economical manufacture, barrel 44 may be provided with a sleeve surrounding and keyed to said barrel for solely sliding movement thereon, said sleeve being solely rotatively mounted on base 42 and having a worm gear meshing with worm 47a whereby rotation of adjusting screw 47 will rotate said sleeve and barrel 44, whereas upon axial movement of said barrel by rotation of adjusting screw 46, said sleeve will remain stationary but the barrel will slide therethrough.

It is to be understood that the several objectives as 6, 7, 8, 9, 10, 10P, 10S, and prisms 31, 62 and 72, are suitably mounted in lens barrel 44 and that the light sources as 20, 50, 60 and 70 are suitably mounted in lamp housing 45.

The systems above illustrated and described should be construed as typical and not as limiting the invention, the scope of which is defined in the appended claims.

In all the optical systems shown the light source may be replaced for a light valve including a light source when said systems are to be employed for recording sound, and in the system shown in Fig. 5, the light producing unit or lamp 55 may be supplied with constant energy for reproducing sound and modulated energy for recording sound, the light projected being constant when constant energy is supplied thereto and modulated when said modulated energy is supplied thereto.

What I claim is:

1. In optical apparatus, an object, an optical system including a light source and objectives for projecting an elongated light image on said object, means to rotate said optical system on the axis thereof for positioning said light image at a desired angularity with respect to said object, light image checking means including an elongated opaque shutter normally positioned out of the light path in said system arranged to be moved to a position in said light path for cancelling all the light projected onto said object by said system when said system has been rotated to said desired angularity but permit leakage of light past said shutter to said object if not rotated to said desired angularity, and means for moving said shutter from one position to the other.

2. In optical apparatus, an object, an optical system including objectives and a light source for projecting an elongated light image having parallel margins onto said object, means to rotate said optical system on the axis thereof for positioning said light image at a desired angle with respect to said object, light image checking means including an elongated opaque shutter having parallel margins correlated to the parallel margins of said light image normally positioned out of the light path of said system arranged to be moved to a position in said light path for cancelling all the light projected onto said object by said system when said system has been rotated to said desired angle but permit leakage of projected light past said shutter to said object if not rotated to said desired angle, and means for moving said shutter from one position to the other.

3. In optical apparatus, a film having an optical sound track including means for advancing the same, and an optical system comprising, an elongated light source intersecting the axis of said system extending in a plane parallel to the plane of advancement of said film, means to optically project a light image of said light source, means to optically rotate said projected light image on said axis to a plane traversing the plane of movement of said film, and means to optically project said rotated light image as an attenuated line of light extending transversely of said sound track.

4. In optical apparatus, a film having an optical sound track including means for advancing said film, an optical system comprising an elongated light source intersecting the axis of said system extending in a plane parallel to the plane of advancement of said film, means to optically project a light image of said light source, means to optically rotate said projected light image on the axis of said system to a plane traversing the plane of movement of said film, means to optically project said rotated light image as an attenuated line of light extending transversely of said sound track means including an opaque shutter normally positioned out of the path of the projected light in said system arranged to be moved to a position in said light path for cancelling all the projected light at said track if said rotated light image has been properly rotated with respect to said sound track but permit light to leak past said shutter to said track if not so properly rotated, and means for moving said shutter from one position to the other.

5. In an optical system, a film having an optical sound track including means for advancing the same, a primary source of light, a quartz prism including a light receiving face positioned to receive light from said light source for illuminating said prism body, a curved face on said prism forming a secondary light source having definite margins, an optical system including a rear objective having a curved face for optically projecting said secondary light source as an attenuated line of light transversely of said sound track, the curvature of said curved face of said prism being correlated to the curvature of the curved face of said rear objective whereby all portions of said secondary light source are in focus with said optical system.

6. In an optical system, a film having an optical sound track including means for advancing said film, a primary source of light, a quartz prism including a light receiving face positioned to receive light from said light source for illuminating the body of said prism, a concave face on said prism forming a secondary light source having defined margins, an optical system including a rear objective having a spherical rear face for optically projecting said secondary light source as an attenuated line of light transversely of said sound track, the curvature of said concave face of said prism being correlated to the curvature of said spherical face of said rear objective whereby all portions of said secondary light source are in focus with said optical system.

7. In an optical system, a film having an optical sound track including means for advancing said film, a primary source of light, a quartz prism including a light receiving face positioned to receive light from said light source for illuminating the body of said prism, a cavo-cylindrical face on said prism forming a secondary light source having definite margins, an optical system including a rear objective having a cylindrical rear face for optically projecting said secondary light source as an attenuated line of light transversely of said sound track, the curvature of said cavo-cylindrical face being correlated to the curvature of said cylindrical rear face whereby all portions of said secondary light source are in focus with said optical system.

8. In optical apparatus, a light sensitive cell, means including a light source and an optical system for projecting a light image having definite margins onto said light cell, light image checking means including a light cancelling member movable into and out of the path of projected light in said system, said light cancelling member having definite margins corresponding to the margins of said light image for cancelling all the light projected onto said light sensitive cell if said optical system is properly focussed but will permit leakage light to pass thereto if said system is not so properly focussed, and means responsive to said light sensitive cell for indicating the amount of said leakage light passing thereto.

9. In optical apparatus, a film having an optical sound track, means for advancing said film, means including a light source for optically projecting a linear light image transversely of said track, mask moving means including a mask which cancels all said projected light to said sound track when inserted into said light beam, fixed means movably supporting said mask moving means for movement of said mask into and out of said light beam, a fixed stop for limiting the movement of said mask moving means when moving said mask out of said light beam, and another fixed stop for limiting the movement of said mask moving means when moving said mask into said light beam.

10. In optical apparatus, a film having an optical sound track, means for advancing said film, means including a light source for optically projecting a linear light image transversely of said track, mask moving means including a mask which cancels all said projected light to said sound track when inserted into said light beam, fixed means movably supporting said mask moving means for movement of said mask into and out of said light beam, a fixed stop for limiting the movement of said mask moving means when moving said mask out of said light beam, and means for adjustably positioning one of said stops.

11. In optical apparatus, a film having an optical sound track, means for advancing said film, means including a light source for optically projecting a linear line of light transversely of said track, mask moving means including a mask which cancels all said projected light to said track when inserted into said light beam, fixed means movably supporting said mask moving means for movement of said mask into and out of said light beam, a fixed stop limiting the movement of said mask moving means when moved into said light beam for cancelling the projected light to said track upon the engagement of said mask moving means with said stop, another fixed stop limiting the movement of said mask moving means when moved out of said light beam for permitting said projected light to reach said sound track upon engagement of said moving means with said last named stop, and means for moving said mask moving means from one stop to the other.

12. In optical apparatus, a film having an optical sound track, means for advancing said film uniformly in one direction, an elongated light source extending in a plane parallel to the plane of advancement of said film, means for optically rotating said light source to form a light image extending transversely with respect to said film advancement, and means for optically projecting said rotated light image as an attenuated line of light transversely of said sound track.

OSCAR A. ROSS.